(12) United States Patent
Neufeld et al.

(10) Patent No.: US 7,035,256 B1
(45) Date of Patent: Apr. 25, 2006

(54) METHOD AND APPARATUS FOR A ROUTING INFORMATION BASE

(75) Inventors: Gerald W. Neufeld, Los Altos, CA (US); Ajay M. Patel, Santa Clara, CA (US); Ravi Chandra, Los Gatos, CA (US)

(73) Assignee: Redback Networks Inc., San Jose, CA (US)

( * ) Notice: Subject to any disclaimer, the term of this patent is extended or adjusted under 35 U.S.C. 154(b) by 838 days.

(21) Appl. No.: 09/999,585

(22) Filed: Oct. 31, 2001

(51) Int. Cl.
*H04L 12/28* (2006.01)
*G06F 12/00* (2006.01)

(52) U.S. Cl. .................. 370/389; 370/395.32; 711/216

(58) Field of Classification Search ................. 370/238, 370/238.1, 252, 254, 400, 389, 395.32, 39, 370/216–228; 709/220, 221, 223, 242–244; 711/216, 221
See application file for complete search history.

(56) References Cited

U.S. PATENT DOCUMENTS

| | | | |
|---|---|---|---|
| 6,069,895 A * | 5/2000 | Ayandeh ..................... 370/399 |
| 6,192,051 B1 * | 2/2001 | Lipman et al. ............. 370/389 |
| 6,801,525 B1 * | 10/2004 | Bodnar et al. .............. 370/352 |
| 2002/0003797 A1 * | 1/2002 | Rautenberg ................. 370/389 |
| 2002/0080794 A1 * | 6/2002 | Reeves et al. ........... 370/395.2 |
| 2002/0118682 A1 * | 8/2002 | Choe ...................... 370/395.31 |
| 2002/0129086 A1 * | 9/2002 | Garcia-Luna-Aceves et al. .......................... 709/200 |
| 2002/0145981 A1 * | 10/2002 | Klinker et al. .............. 370/244 |

OTHER PUBLICATIONS

Choe, Myongsu, "High-speed IP routing lookups and routing table management", Dec. 22, 2000, U.S. Appl. No. 60/257,148, 1-19.*
David Piscitello, Bellcore and A. Lyman Chapin, Introduction to Routing, www.corecom.com, excerpt from Open Systems Networking: TCP/IP and OSI, Addison Wesley Publishers, 1993.
Y. Rekhter, and T. Li, A Border Gateway Protocol 4 (BGP-4), Network Working Group, Request for Comments: 1771, Mar. 1995.

* cited by examiner

*Primary Examiner*—Steven Nguyen
(74) *Attorney, Agent, or Firm*—Blakely, Sokoloff, Taylor & Zafman LLP

(57) ABSTRACT

A method and apparatus for managing an information routing information base is described. A method comprises managing a routing information base (RIB), the RIB including a first set of elements that indicate a set of destinations, a second set of elements that indicate a set of next hops, a third set of elements that indicate a set of interfaces, receiving a message that indicates a modification to a plurality of routes corresponding to a plurality of the first set of elements, and modifying a first relationship between one of the second set of elements and a first one of the third set of elements and a second relationship between the one of the second set of elements and a second one of the third set of elements in accordance with the message, the one of the second set of elements referenced by the plurality of the first set of elements.

28 Claims, 14 Drawing Sheets

ELEMENT OF
DESTINATION DATA STRUCTURE
201

| PREFIX 203 | DISTANCE 205 | ... | METRIC 207 | NEXT HOP POINTER 209 |
|---|---|---|---|---|

ELEMENT OF
NEXT HOP DATA STRUCTURE
211

| NEXT HOP 213 | REFERENCE COUNTER 215 | NEXT HOP POINTER 217 |
|---|---|---|

ELEMENT OF
INTERFACE DATA STRUCTURE
219

| INTERFACE 221 | NEXT HOP BACK POINTER 223 |
|---|---|

ROUTING TABLE
100

| DESTINATION | NEXT HOP | INTERFACE | ... | METRIC TAG |
|---|---|---|---|---|
| A | X | 1 | ... | ... |
| B | X | 1 | ... | ... |
| C | X | 1 | ... | ... |
| ... | ... | ... | ... | ... |
| M | Z | 3 | ... | ... |
| N | Z | 3 | ... | ... |

FIG. 1A (PRIOR ART)

| FORWARDING TABLE 101 | | |
|---|---|---|
| DESTINATION | NEXT HOP | INTERFACE |
| A | X | 1 |
| B | X | 1 |
| C | X | 1 |
| ... | ... | ... |

| | | |
|---|---|---|
| M | Z | 3 |
| N | Z | 3 |

FIG. 1B (PRIOR ART)

ELEMENT OF
DESTINATION DATA STRUCTURE
201

| PREFIX 203 | DISTANCE 205 | ... | METRIC 207 | NEXT HOP POINTER 209 |

FIG. 2A

ELEMENT OF
NEXT HOP DATA STRUCTURE
211

| NEXT HOP 213 | REFERENCE COUNTER 215 | NEXT HOP POINTER 217 |

FIG. 2B

ELEMENT OF
INTERFACE DATA STRUCTURE
219

| INTERFACE 221 | NEXT HOP BACK POINTER 223 |

FIG. 2C

METHOD AND APPARATUS FOR A ROUTING INFORMATION BASE

BACKGROUND OF THE INVENTION

1. Field of the Invention

The invention relates to the field of communication. More specifically, the invention relates to communication networks.

2. Background of the Invention

A router hosts a routing protocol(s) that can include the Routing Information Protocol (RIP), the Interior Gateway Protocol (IGP), the Border Gateway Protocol (BGP), the Exterior Gateway Protocol (EGP), Open Short Path First (OSPF), Intermediate System to Intermediate System (IS—IS), etc. The router exchanges messages with neighboring routers in accordance with one or more of the hosted routing protocols. These messages are used to maintain a table of routing information ("routing table"). A routing table stores the state of the network topology and the best-known paths to destinations. A given routing table can include path information for hundreds of thousands of paths. Path information typically includes a destination network prefix, an Internet Protocol (IP) address for a next hop, an outgoing physical interface or port number, metrics of the path, etc.

FIG. 1 (PRIOR ART) is a diagram illustrating a prior art routing table. Routing tables are comprised of multiple columns. The routing table illustrated in FIG. 1 identifies destinations in the first column of the routing table 100. In the second column of the routing table 100, addresses for next hops corresponding to the destinations in the first column are identified. In the third column of the routing table 100, interfaces corresponding to the next hops in the second column are identified. A given row of the routing table 100 describes a path to the destination identified in the first column of the given row.

In the routing table 100 illustrated in FIG. 1, rows 1–3 of the routing table 100 identify destinations A, B, and C. The next hop in the paths to the destinations A–C is a network device X as indicated in the routing table 100. The interface for the next hop X is the interface 1 as indicated in the third column of rows 1–3 of the routing table 100. The last two rows of the routing table 100 identify a next hop for destinations M and N as Z. The last two rows identify an interface 3 as the interface corresponding to the next hop Z.

At startup, a given router, which hosts the routing table 100, downloads the routing table 100 into each of the router's line cards. The given router may download the entire routing table 100, or selected columns from the routing table 100, but every row of the routing table 100 is downloaded as a forwarding table for each line card. Typically, a router downloads the information in the first 3 columns of the routing table 100 for each of its line cards as the forwarding table. A router hosting the routing table 100 may download the first three columns of the routing table 100 as a forwarding table. FIG. 1B (PRIOR ART) illustrates a forwarding table 101 illustrated downloaded into each of the router's line cards.

Line cards host forwarding tables in order to remove from the central processing unit the intensive task of processing traffic. When a given one of a router's line cards receives traffic, the line card processes the traffic to determine the traffic's destination and forwards the traffic to the outgoing physical interface indicated by the line card's forwarding table. For example, a line card that receives traffic destined for the network device A determines that the traffic should be forwarded to the interface 1 as indicated in the forwarding table 101.

Unfortunately, a change in status of a next hop or a physical interface typically affects thousands of entries in the routing table. For example, if the physical interface 1 fails, then all entries in the routing table 100 that correspond to the physical interface, must be modified to a different interface. The thousands of modified entries in the routing table 100 are then downloaded to each line card. Downloading such a mass of data to each line card of a router consumes valuable resources of the router (e.g., memories in the line cards, system bus(es), etc.) and can cause packets to be dropped.

This problem is exacerbated when a route flap occurs. A poorly connected wire at a physical interface that fails intermittently typically causes a route flap. The intermittent failure causes repeated changes to entries in the routing table 100. Each change in the routing table 100 caused by the route flap prompts the router to download the modified entries of the routing table 100 to each of the router's line cards. These repeated changes and the downloading of path information for thousands of entries affected by the route flap severely impacts performance of the router, if bringing it down completely.

BGP route flap damping as described in Request for Comments (RFC) 2439 has been proposed as a solution to route flaps. Unfortunately, BGP route flap damping only limits the period of time a router will be overloaded instead of solving the problems caused by route flaps. Moreover, a router is still exposed to failure from route flapping before BGP route flap damping is triggered.

BRIEF SUMMARY OF THE INVENTION

A method and apparatus for a routing information base (RIB) is described. According to one aspect of the invention, a computer implemented provides for managing a routing information base (RIB). The RIB includes a first set of elements that indicate a set of destinations, a second set of elements that indicate a set of next hops, and a third set of elements that indicate a set of interfaces. The computer implemented method further provides for receiving a message that indicates a modification to a plurality of routes corresponding to a plurality of the first set of elements. A first relationship between one of the second set of elements and a first one of the third set of elements is modified. In addition, a second relationship between the one of the second set of elements and a second one of the third set of elements is modified. Both the first relationship and the second relationship are modified in accordance with the message. The one of the second set of elements is referenced by the plurality of the first set of elements.

These and other aspects of the present invention will be better described with reference to the Detailed Description and the accompanying Figures.

BRIEF DESCRIPTION OF THE DRAWINGS

The invention may best be understood by referring to the following description and accompanying drawings that are used to illustrate embodiments of the invention. In the drawings:

FIG. 1 (PRIOR ART) is a diagram illustrating a routing table.

FIG. 1B (PRIOR ART) illustrates a forwarding table 101 illustrated downloaded into each of the router's line cards.

FIG. 2A is a block diagram illustrating an element of a destination data structure according to one embodiment of the invention.

FIG. 2B is a block diagram illustrating an element of a next hop data structure according to one embodiment of the invention.

FIG. 2C is a diagram illustrating an element of an interface data structure according to one embodiment of the invention.

DETAILED DESCRIPTION OF THE DRAWINGS

Figure 3A:
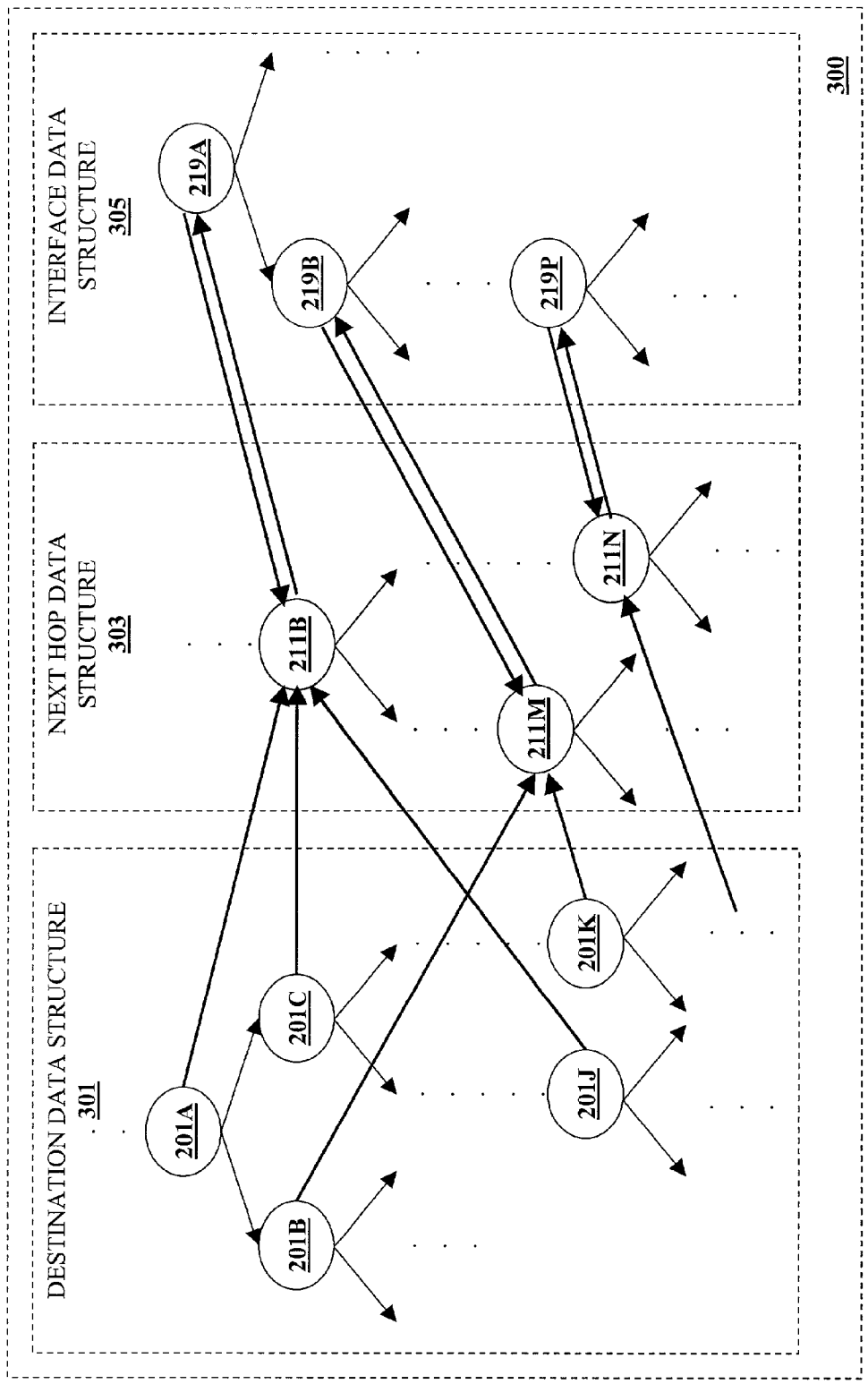
FIG. 3A is a diagram illustrating an exemplary routing information base according to one embodiment of the invention.

In the following description, numerous specific details are set forth to provide a thorough understanding of the invention. However, it is understood that the invention may be practiced without these specific details. In other instances, well-known circuits, structures, standard, and techniques have not been shown in detail in order not to obscure the invention.

FIGS. 2A–2C are block diagrams illustrating individual elements of data structures of a routing information base (RIB) according to one embodiment of the invention. FIG. 2A is a block diagram illustrating an element of a destination data structure according to one embodiment of the invention. A destination element 201 of the destination data structure includes a destination field 203. The destination field indicates a network address (e.g., a network prefix, an IP address, etc.). The destination element 201 can also include additional fields to describe a route, such as a distance field 205 and a metric field 207. The distance field 205 can indicate a distance from the local network device (i.e., the network device hosting the RIB) to the destination indicated in the destination field 203. The metric field 207 indicates a metric that can vary with the routing protocol (e.g., the maximum hop). The element 201 also includes a next hop pointer field 209. The next hop pointer field 209 references an element in a next hop data structure of the RIB.

FIG. 2B is a block diagram illustrating an element of a next hop data structure according to one embodiment of the invention. In FIG. 2B, a next hop element 211 includes three field: a next hop field 213, a reference counter field 215, and a next hop pointer field 217. The next hop field 213 indicates an address for the next hop in relation to the local network device. The reference counter field 215 indicated the number of destination elements references the next hop element. The next hop pointer field 217 references a next hop in relation to the network device indicated in the next hop field 213. The next hop pointer field 217 of the next hop element 211 is similar to the next hop pointer field 209 of the destination element 201. The next hop pointer field 217 can reference another next hop element 209 or an element in an interface data structure.

FIG. 2C is a diagram illustrating an element of an interface data structure according to one embodiment of the invention. In FIG. 2C, an interface element 219 includes two fields: an interface field 221 and a next hop back-pointer field 223. The interface field 221 indicates an interface of the local network device. The interface could be a logical interface or a physical interface. The next hop back-pointer field 223 references the next hop element that references the interface element 219.

Figure 3B:
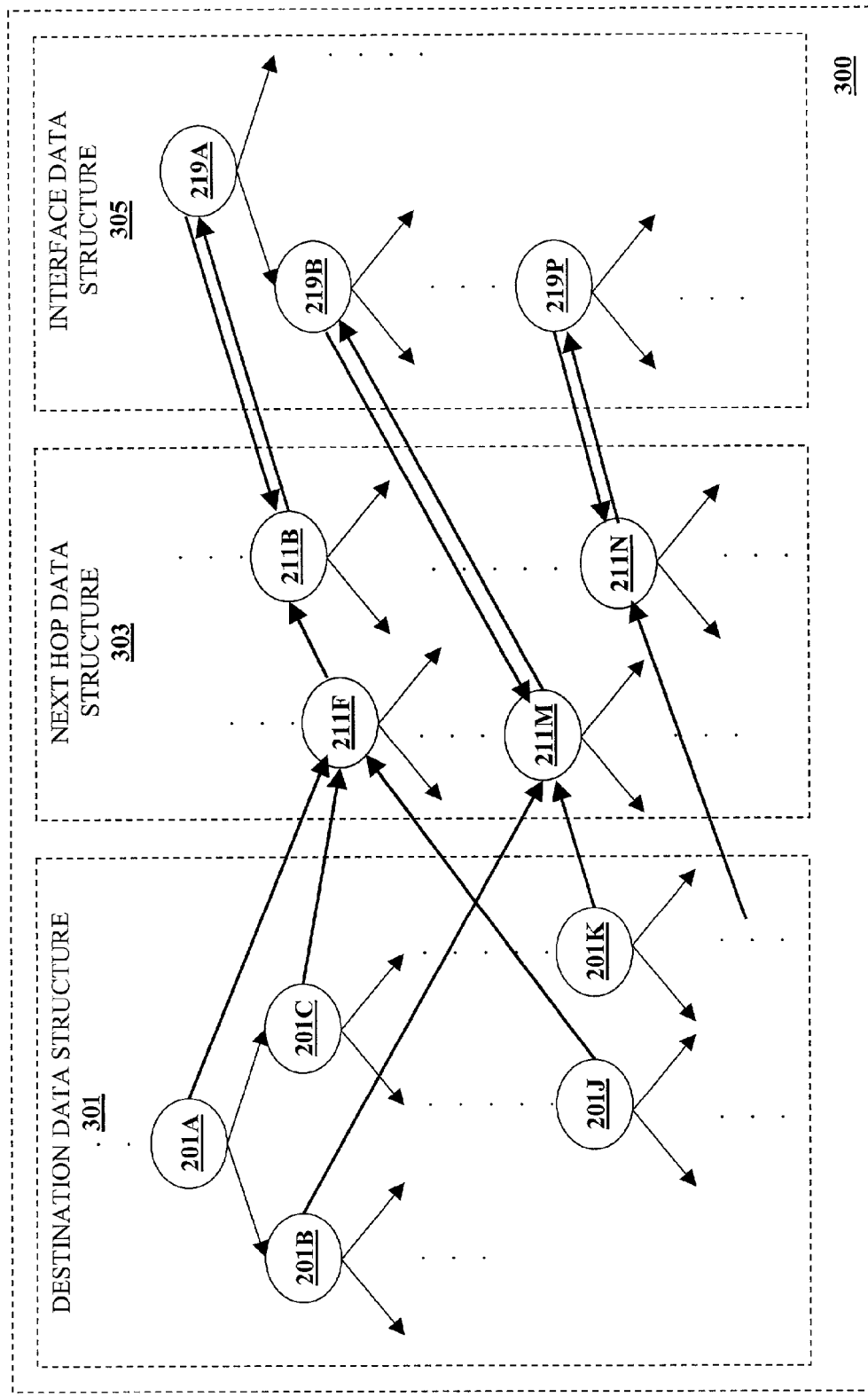
FIG. 3B is a diagram illustrating an exemplary routing information base with a level of indirection according to one embodiment of the invention.
Figure 4A:
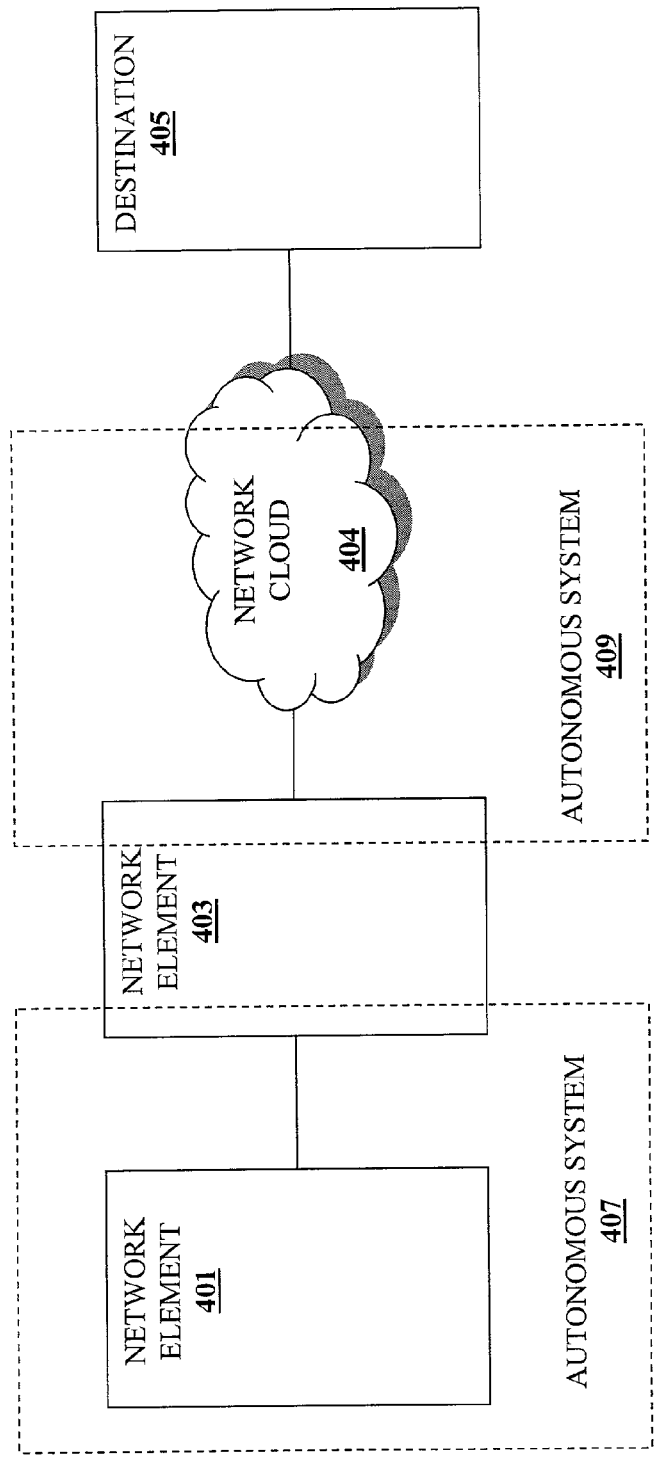
FIG. 4A is a block diagram illustrating an exemplary network according to one embodiment of the invention.
Figure 4B:
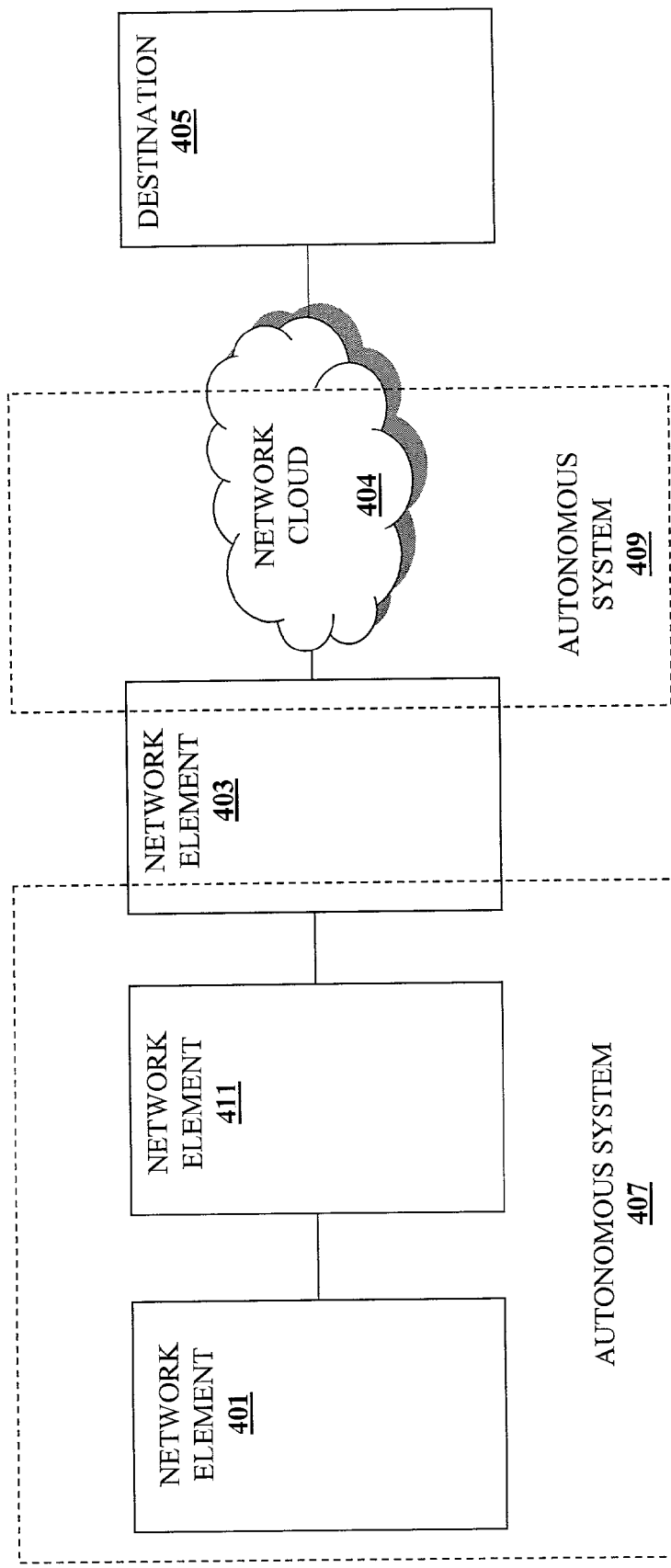
FIG. 4B is a diagram illustrating an exemplary network with an intermediate network device according to one embodiment of the invention.

FIGS. 3A–3B are diagrams illustrating exemplary routing information bases according to one embodiment of the invention. FIGS. 4A–4B illustrate exemplary networks according to one embodiment of the invention. FIGS. 3A–3B will be described with reference to FIGS. 4A–4B. FIG. 3A is a diagram illustrating an exemplary routing information base according to one embodiment of the invention. In FIG. 3A a destination data structure 301 is comprised of destination elements 201A–201K. A next hop data structure 303 is comprised of next hop elements 211B–211M. An interface data structure 305 is comprised of interface elements 219A–219P. Each of the data structures 301, 303, and 305 can be comprised of numerous elements, but the illustration is limited to a few elements to avoid obscuring the desired invention.

FIG. 4A is a block diagram illustrating an exemplary network according to one embodiment of the invention. In FIG. 4A a network device 401, which hosts the RIB illustrated in FIG. 3A, is located within an autonomous system 407. The network device 401 is coupled with a network device 403. The network device 403 acts as a border router between the autonomous system 407 and an autonomous system 409. Hence, FIG. 4A illustrates the network device 403 as being located within both autonomous systems 407 and 409. The network device 403 is coupled with a network cloud 404. Part of the network cloud 404 is within the autonomous system 409 to illustrate that some of the network devices within the network cloud 404 may be within the autonomous system 409 while other network devices of the network cloud 404 may be external to the autonomous system 409. The network cloud 404 is coupled with a destination 405. In this illustration, the route to the destination 405 has been inserted into the RIB 300. The destination field 203 of the destination element 201C indicates the destination 405.

Returning to FIG. 3A, the next hop pointer field 209 of each of the destination elements 201A, 201C, and 201J reference a next hop element 211B. A number of other elements in the destination data structure 301 may reference the next hop element 211B, but are not shown in order to avoid obscuring the invention. The next hop field 213 of the next hop element 211B indicates the network device 403. The next hop pointer field 217 of the next hop element 211B references an interface element 219A. The interface field 221 of the interface element 219A indicates an interface of the network device 401 for reaching the network device 403. The next hop back-pointer field 223 of the interface element 219A references the next hop element 211B.

FIG. 3A shows additional relationships to illustrate other exemplary possibilities for the RIB 300. These additional relationships are not reflected in FIG. 4A. The next hop pointer field 209 of the destination element 201B and the destination element 201K reference the next hop element 211M. The next hop pointer field 217 of the next hop element 211M references an interface element 219B. The next hop back-pointer field 223 of the interface element 219B references the next hop element 211M. A next hop element 211N is referenced by a number of destination elements not illustrated in FIG. 3A. The next hop pointer field 217 of the next hop element 211M references an interface element 219P. The next hop back-pointer field 223 of the interface element 219P references the next hop element 211N.

FIG. 3B is a diagram illustrating an exemplary routing information base with a level of indirection according to one embodiment of the invention. FIG. 3B is similar to FIG. 3A, but has an additional next hop element 211F. FIG. 4B is a diagram illustrating an exemplary network with an intermediate network device according to one embodiment of the invention. FIG. 4B is similar to FIG. 4A except that an intermediate network device 411 is located between the network device 401 and the network device 403. In FIG. 4B, the network device 411 is within the autonomous system 407.

As in FIG. 3A, the destination field 203 of the destination element 201C in FIG. 3B indicates the destination 405. Instead of the next hop pointer field 209 of the destination elements 201C, 201A, and 201J referencing the next hop element 211B, the next hop pointer field 209 of the destination elements 201C, 201A, and 201J references the next hop element 211F. The next hop field 213 of the next hop element 211F indicates the intermediate network device 411. The next hop pointer field 217 of the next hop element 211F references the next hop element 211B. As in FIG. 3A, the next hop field 213 of the next hop element 211B indicates the network device 403. The next hop pointer field 217 of the next hop element 211B references the interface element 219A.

The RIB 300 illustrated in FIGS. 3A–3B maintains detailed path information for routes. This detailed information may be used in various embodiments for routing decisions, traffic shaping, etc. In addition, the data structures 301, 303 and 305 of the RIB 300 provide for flexibility. This flexibility enables efficient handling of route flaps, as will be described herein, without destroying performance of the network device hosting the RIB 300.

Embodiments of the invention can implement the destination data structure 301, the next hop data structure 303, and the interface data structure 305 with various types and combinations of data structures. For example, the destination data structure 301 and the next hop data structure 303 may be implemented as radix tries, while the interface data structure may be implemented as a PATRICIA trie. As another example, all three data structures 301, 303, and 305 may be implemented as radix tries. As another example, the destination data structure 301 may be implemented as a binary trie.

In an embodiment of the invention that implements the destination data structure 301 as a binary trie, the destinations are not explicitly stored in the elements of the binary trie, but are determined by concatenating the path labels during traversal of the binary trie with a longest matching prefix algorithm. In another embodiment of the invention, the destination data structure 301 is a multi-ary trie. In the multi-ary trie, the length of a destination is mk, which is an integral multiple of k (k being the stride of the multi-ary trie). The prefix is stored at level m of the trie. A prefix that is not of a length that is a multiple of k is expanded to form multiple prefixes. The described embodiments of the invention are intended to aid in the understanding of the described invention, and not meant to be limiting upon the described invention.

The RIB 300 illustrated in FIGS. 3A–3B is created and maintained by processes hosted on the local network device. In an embodiment of the invention, a thread or process creates and/or handles messages for the creation and maintenance of the RIB. These messages can be received from processes hosted by the local network device (e.g., BGP, RIP, etc.) In such an embodiment, another thread or process executes commands to create and maintain the RIB in response to the messages.

Figure 5:
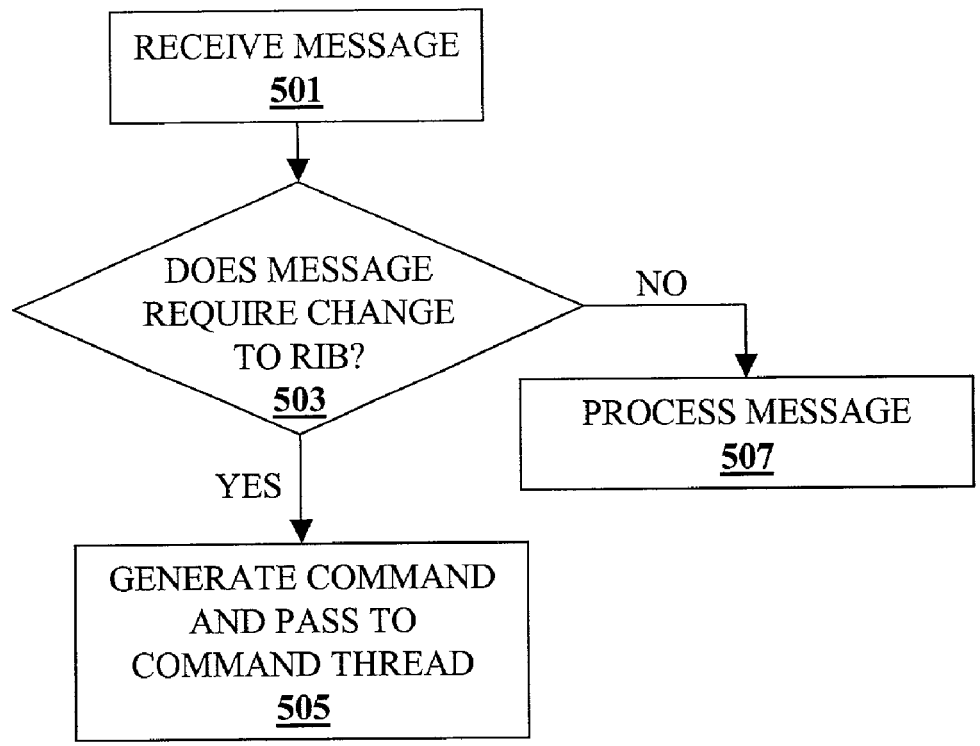
FIG. 5 is a flow chart for a message thread to handle messages according to one embodiment of the invention.

FIG. 5 is a flow chart for a message thread to handle messages according to one embodiment of the invention. At block 501, the message thread receives a message. At block 503, the message thread determines if the message requires a change to the RIB. If the message does not require a change to the RIB, then at block 507 the message thread processes the message (e.g., creates a response message, updates a value for a time to live message, etc.). If the message thread determines that the message requires a change to the RIB at block 503, then at block 505 the thread generates a command and passes the command to a module maintaining the RIB ("RIB module"). The RIB module can be a process(es), task(s), thread(s), etc., hosted on a processor(s), ASIC, etc. However, embodiments of the invention are not so limited as the RIB module can be made as different types of hardware (such as digital logic) executing the processing described with reference to the RIB module. In another embodiment of the invention, the message thread passes RIB related messages to the RIB module. The RIB module generates commands from the messages passed by the message thread.

Figure 6A:
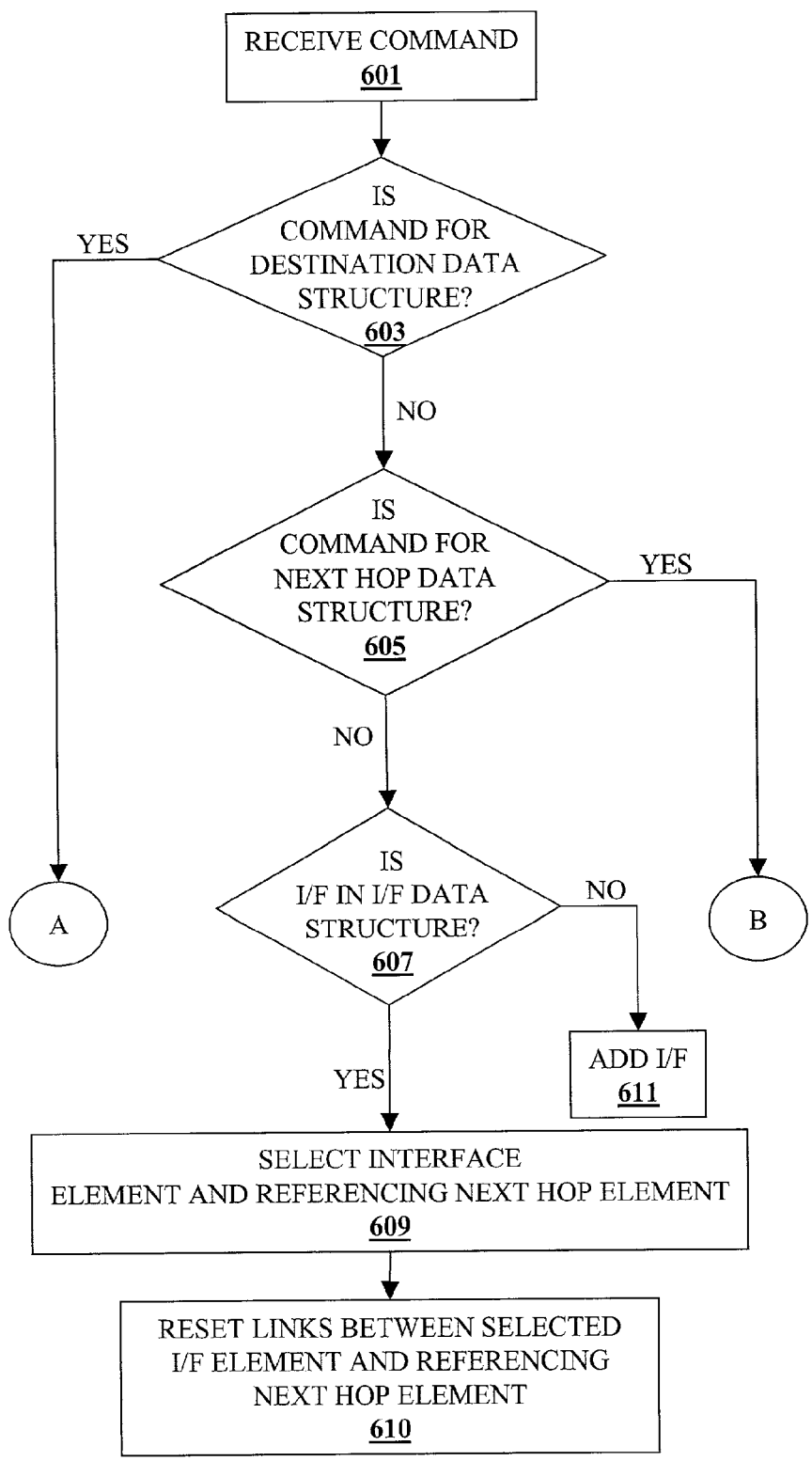
FIG. 6A is a flow chart for handling a command according to one embodiment of the invention.
Figure 6B:
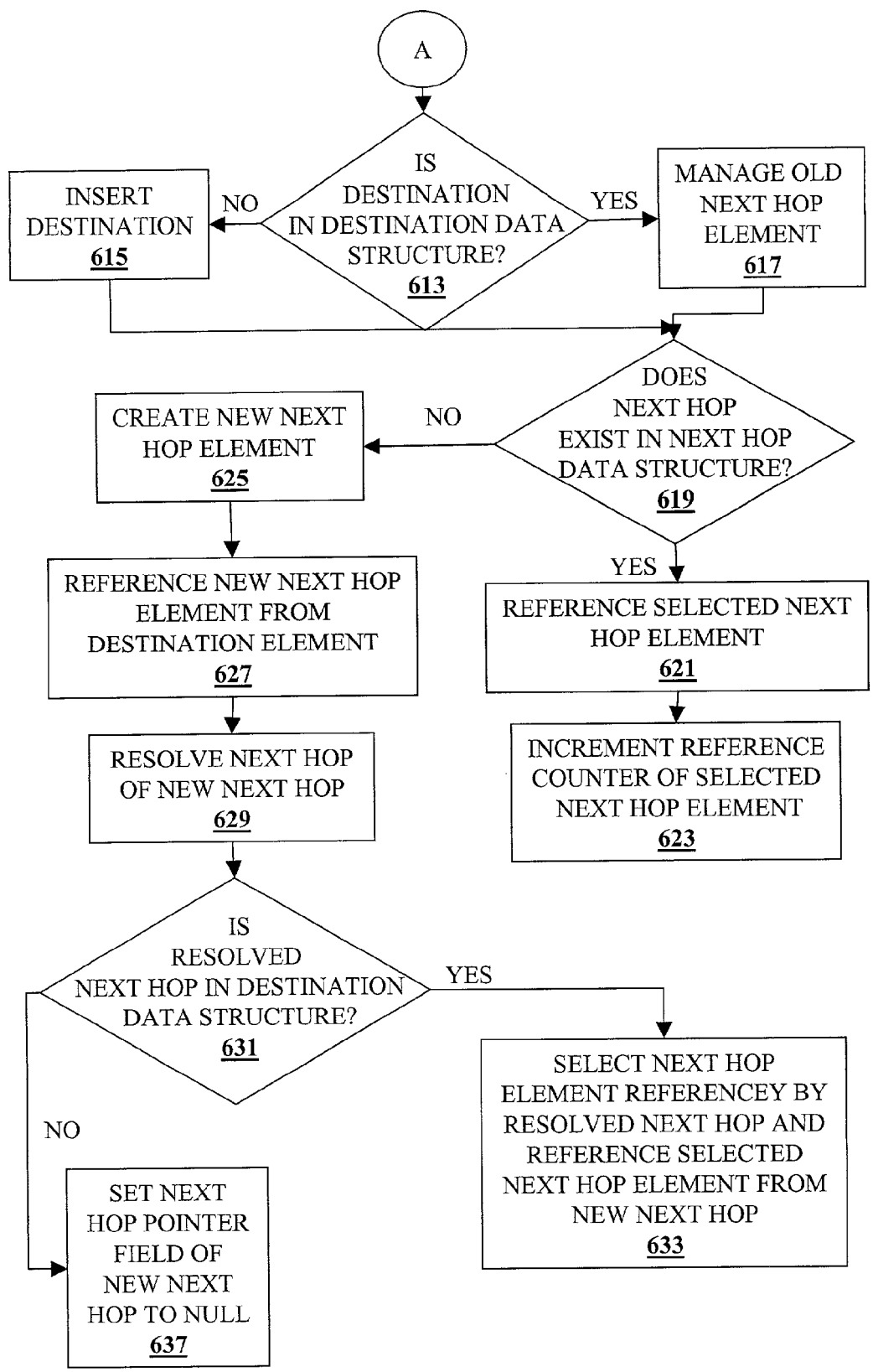
FIG. 6B is a flow chart for handling a command which effects the destination data structure 301 according to one embodiment of the invention.
Figure 6C:
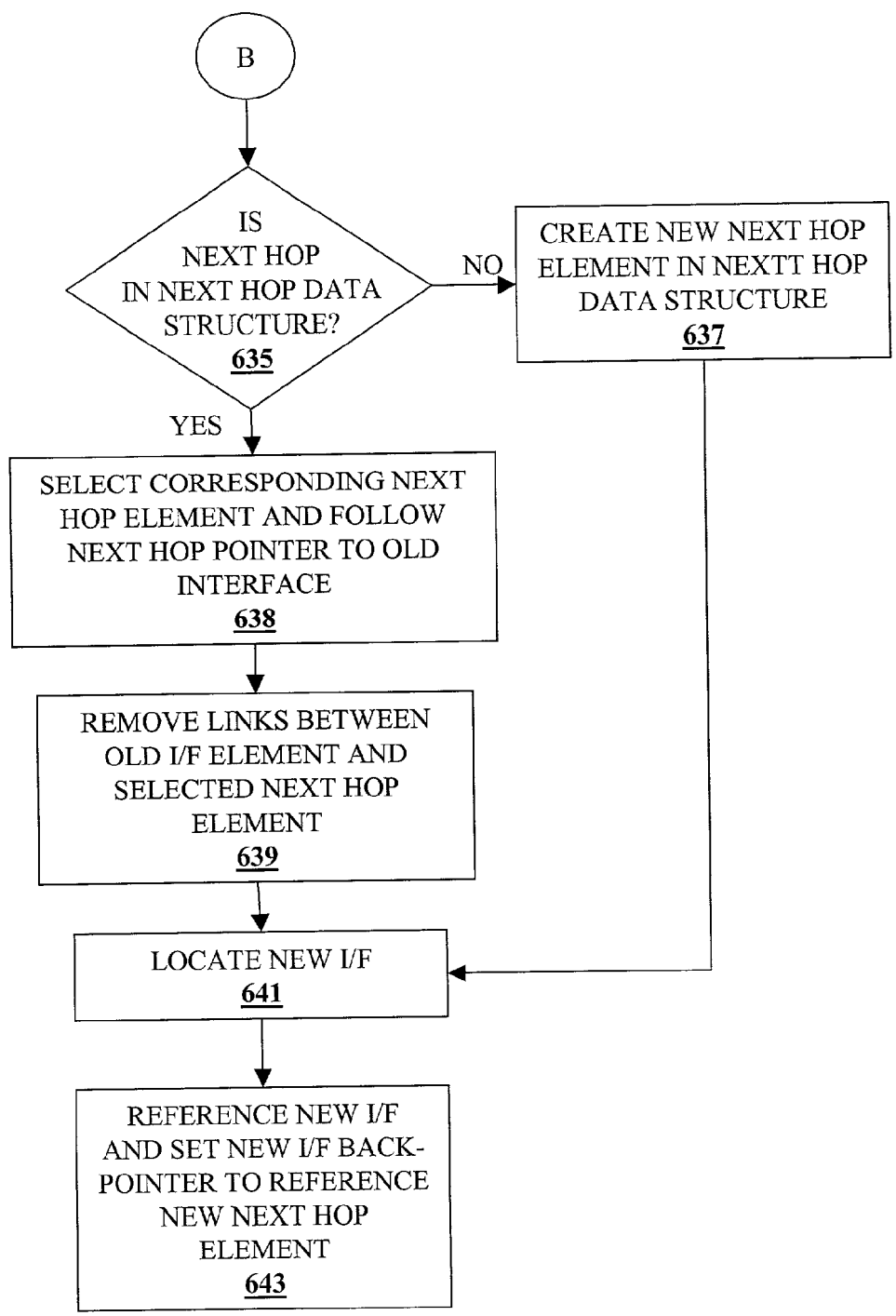
FIG. 6C is a flow chart for handling a next hop command according to one embodiment of the invention.

FIGS. 6A–6C are flow charts for handling a command related to the RIB according to one embodiment of the invention. FIG. 6A is a flow chart for handling a command according to one embodiment of the invention. At block 601 a RIB module receives a command. At block 603, the RIB module determines if the command is for the destination data structure. If the command is for the destination data structure, then control flows to block 613. If the RIB module determines that the command does not affect the destination data structure, then at block 605 the RIB module determines if the command is for the next hop data structure. If the RIB module determines that the command is for the next hop data structure, then control flows to block 635. If the RIB module determines that the command is not for the next hop data structure, then at block 607, the RIB module determines if the interface identified in the command is indicated in an interface element of the interface data structure 305. If the RIB module determines that the interface identified in the command is within the interface data structure 305, then at block 609 the RIB module selects the indicating interface element and follows the next hop back-pointer of the selected interface element to a referencing next hop element 211. At block 610, the RIB module resets the links between the selected interface element 219 and the referencing next hop element 211. For example, the RIB module sets the next hop pointer field 217 of the referencing next hop element and the next hop back-pointer field 217 of the selected interface element to null. If at block 607 the RIB module determines that the interface identified in the command is not in the interface data structure 305, then at block 611 the RIB module adds an interface element to the interface data structure 305 for the identified interface.

FIG. 6B is a flow chart for handling a command which effects the destination data structure 301 according to one embodiment of the invention. At block 613, the RIB module determines if the destination identified in the command is within the destination data structure 305. If the destination is not in the destination data structure 305, then at block 615 the RIB module inserts the destination and its associated information into the destination data structure 305 (i.e., creates a destination element and sets its fields accordingly). Control flows from block 615 to block 619. If the RIB module determines that the destination identified in the command is indicated in a destination element of the destination data structure 305, then at block 617 the RIB module manages an old next hop element currently referenced by the indicating destination element. At block 619, the RIB module determines if a next hop element in the next hop structure 303 indicates the new next hop identified by the command. If the RIB module locates an indicating element in the next hop data structure 303, then at block 621 the RIB module references the indicating next hop element from the next hop pointer field 209 of the indicating destination element. At block 623, the RIB module increments the reference counter field 215 of the indicating next hop element. If at block 619 the RIB module does not locate the new next hop within the next hop data structure 303, then at block 725 the RIB module creates a new next hop element. At block 727 the RIB module references the new next hop element from a next hop pointer field 209 of the indicating destination element.

At block 629, the RIB module resolves the new next hop. At block 631, the RIB module determines if the resolved next hop is in the destination data structure 301. If the resolved next hop is not in the destination data structure 301, then at block 637, the RIB module sets the next hop pointer field 217 of the new next hop element to null. If the RIB determines that the resolved next hop is indicated by a destination element in the destination data structure 301, then the RIB module selects the next hop element referenced by the destination element that indicates the resolved next hop at block 633. Also at block 633, the RIB module references the selected next hop element from the next hop pointer field 217 of the new next hop element.

FIG. 6C is a flow chart for handling a next hop command according to one embodiment of the invention. At block 635, a RIB module determines if the next hop identified by the command has a corresponding next hop element in the next hop data structure 303. If there is not a corresponding next hop element, then the RIB module creates a new next hop element for the identified next hop at block 637. From block 637 control flows to block 641. If at block 635, the RIB module locates the corresponding next hop element for the identified next hop, then at block 638 the RIB module selects the corresponding next hop element and follows the next hop pointer of the selected next hop element to an old interface element.

At block 639, the RIB module resets the next hop back-pointer of the old interface element and the next hop pointer of the selected next hop element (e.g., to null). At block 641, the RIB module locates the interface element corresponding to the new interface, which is identified by the command, in the interface data structure 305. At block 643, the RIB module sets the next hop pointer field 217 of the selected next hop element to reference the new interface element. Also in block 643, the RIB module sets the next hop back-pointer field 223 of the new interface element to the selected next hop element.

Figure 7:
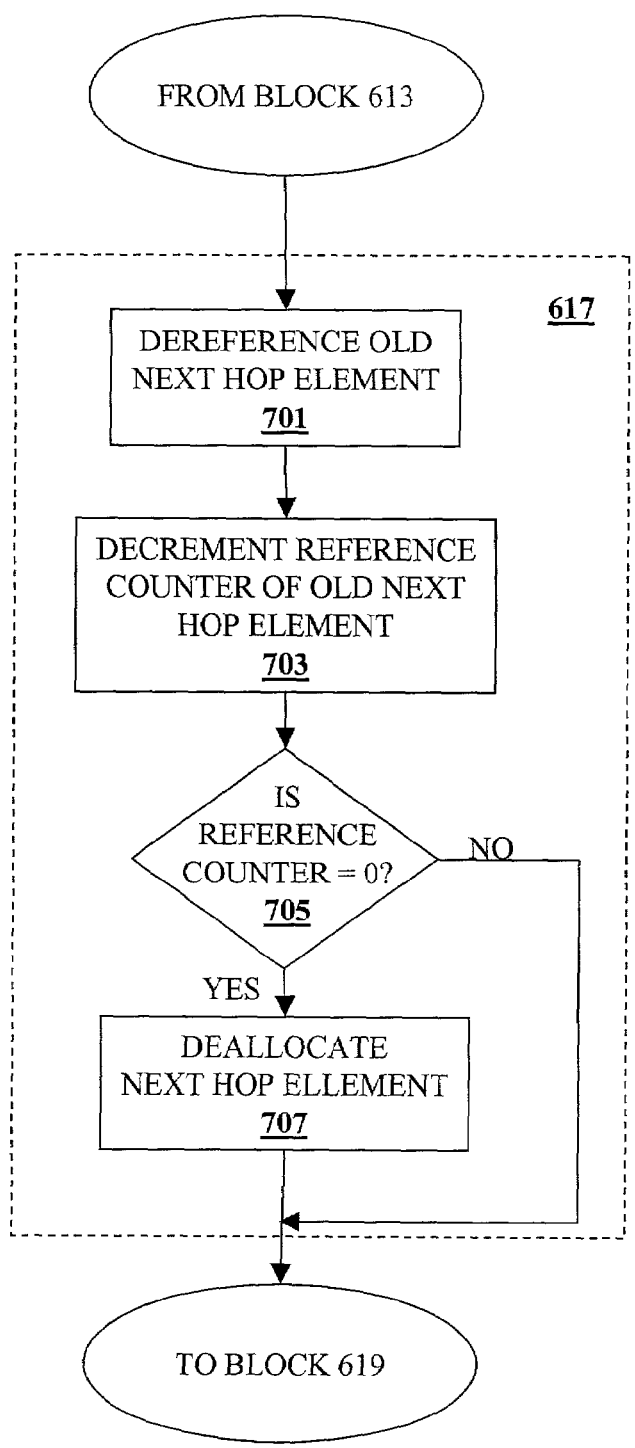
FIG. 7 is a flow diagram for managing an old next hop structure as indicated at block 617 of FIG. 6B according to one embodiment of the invention.

FIG. 7 is a flow diagram for managing an old next hop structure as indicated at block 617 of FIG. 6B according to one embodiment of the invention. At block 701, the RIB module dereferences the old next hop element from the corresponding destination element in the destination data structure 301. At block 703, the RIB module decrements the reference counter indicated in the reference counter field 215 of the old next hop element. At block 705, the RIB module determines if the reference counter of the old next hop element is equal to zero. If the reference counter of the old next hop element is not equal to zero, then control flows to block 619 of FIG. 6B. If the reference counter of the old next hop element is equal to zero, then at block 707 the RIB module deallocates the old next hop element. FIG. 7 describes one technique for clearing old next hop structures, but various embodiments may implement different techniques for clearing old next hop structures.

As described in FIGS. 6A–6C, modifications to the RIB 300 do not require changes to a large number of entries in the destination data structure 301. With the exceptions of adding and deleting routes, modifications to the RIB 300 can be completed by modifying the specifically affected elements. The importance of modifying the RIB 300 with minimal processing is emphasized when considering route flaps.

Figure 8:
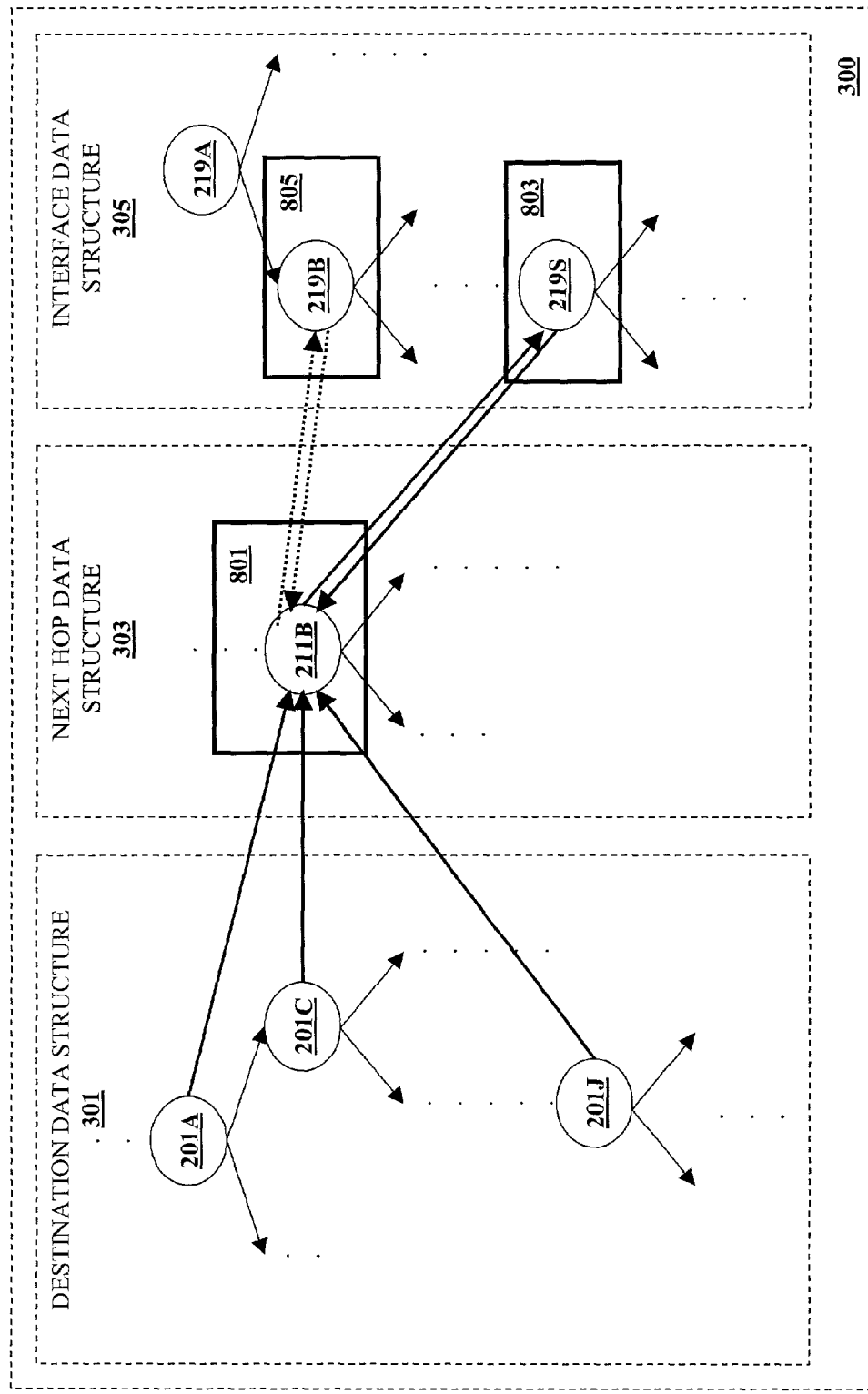
FIG. 8 is a block diagram illustrating the RIB 300 with modifications according to one embodiment of the invention.
Figure 9:
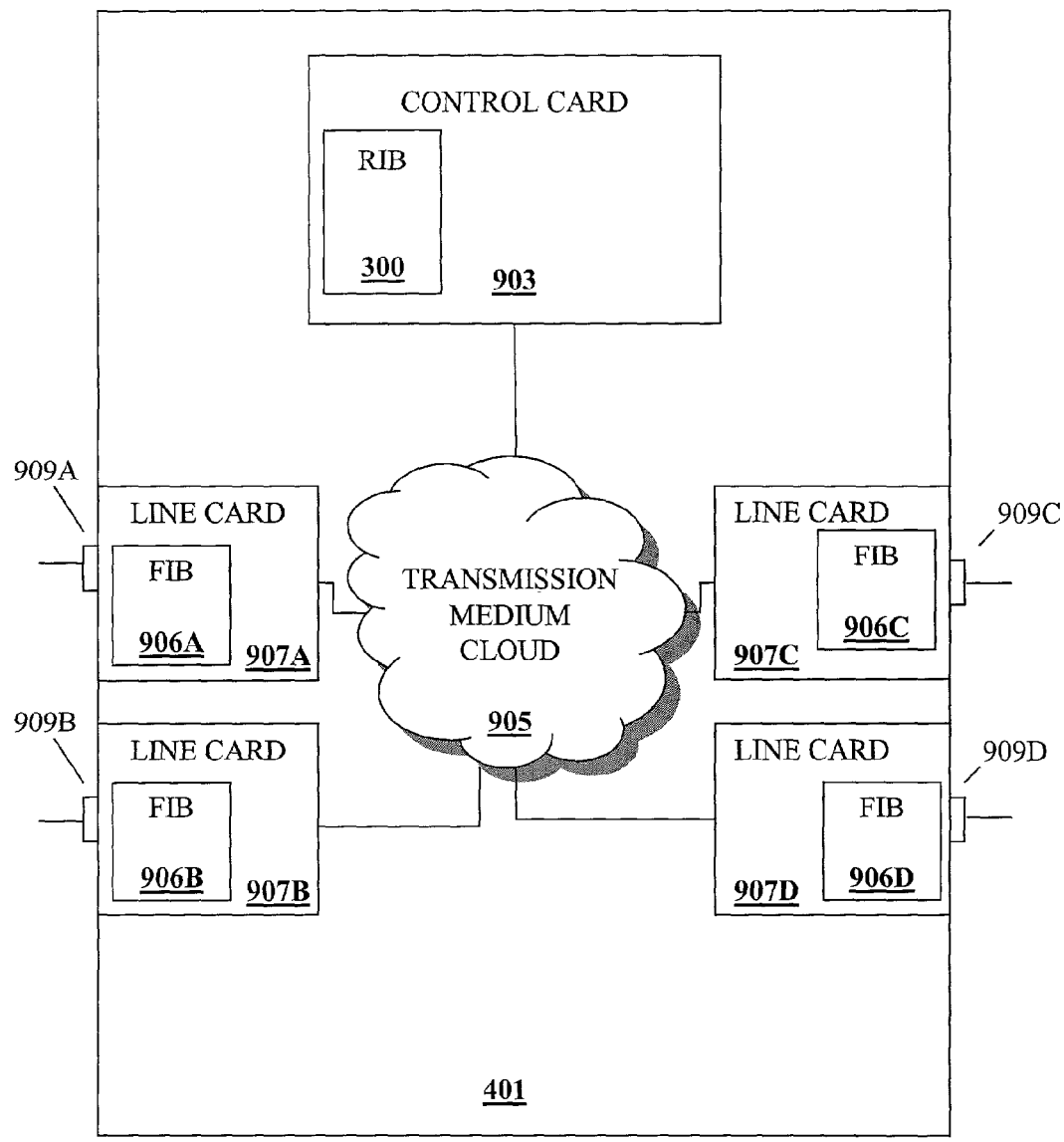
FIG. 9 is a block diagram illustrating the exemplary network device 401 according to one embodiment of the invention.

FIG. 8 is a block diagram illustrating the RIB 300 with modifications according to one embodiment of the invention. FIG. 9 is a block diagram illustrating the exemplary network device 401 according to one embodiment of the invention. FIGS. 8 and 9 will be described with reference to each other. In FIG. 9, relationships between elements in the RIB 300 have been modified from those illustrated in the RIB 300 in FIG. 3A. The next hop element 211B of FIG. 8 references an interface element 219S. In FIG. 8, the next hop element 211B is also shown referencing the interface element 219B, as in FIG. 3A. The next hop element 211B is shown referencing both interface elements 219B and 219S to illustrate a route flap. The next hop element 211B switches back and forth between the interface elements 219B and 219S in response to messages received because of the route flap. The modified elements of the RIB 300 that are modified because of the route flap are designated with blocks 801, 803, and 805.

In FIG. 9, the RIB 300 is shown as being hosted on a control card 903 of the network device 401. In various embodiments of the invention, the RIB 300 can be hosted on a co-processor, an ASIC, etc. The control card 903 is coupled with a transmission medium cloud 905 (e.g., a system bus, point to point links, etc.). The transmission medium cloud 905 is coupled with line cards 907A–907D. The line cards 907A–907D host forwarding information bases (FIBs) 906A–906D respectively. The line cards 907A–907D are coupled to physical interfaces 909A–909D respectively. Each time the RIB 300 is modified, the modified relationships between the elements designated by the blocks 801, 803, and 805 are transmitted to the line cards 907A–907D.

Various embodiments of the invention download the modified relationships between the elements with different methods. In one embodiment of the invention, a download process maps memory locations of the elements in the RIB 300 to memory locations of corresponding elements in the FIBs 906A–906D. The download process can indicate the affected memory locations and modified relationships to be implemented to corresponding memory locations of the line cards 907A–907D. The download process can also transmit the modified elements of the RIB 300 to the line cards 907A–907D as elements to be inserted into the FIBs 906A–906D, respectively. The described embodiments of the invention are meant to aid in the understanding of the invention and are not meant to be limiting upon the invention.

It can be seen that although the transmission medium cloud 905 will carry the modified relationships between the elements designated by blocks 801, 803, and 805 repeatedly until the route flap stops, the information reflecting the modified relationships (e.g., the elements, memory addresses, etc.) is a relatively small amount of the RIB 300. If 10,000 destination elements reference the next hop element 211B, the present embodiments of the invention enable the interface changes illustrated in FIG. 8 to be conveyed to the FIBs 906A–906D by downloading the modified relationships between the elements 211B, 219B, and 219S. Hence, the described embodiments of the invention avoid impacts to system performance by only downloading the affected elements instead of downloading 10,000 route entries that are affected by the route flap. Thus, a network device will not as readily be brought to a halt by overwhelming data transfers.

Although BGP route flap damping alleviates some of the problems caused by route flaps, a network device still suffers from repeated route advertisements from a route flap before it is damped. In one embodiment of the invention, the number of repeated downloads of modified parts of the RIB 300 are limited. Once the limit is reached, the changes resulting from the route flap are no longer downloaded to the FIBs because the affected routes are marked as being down. Various embodiments of the invention can limit download by other factors or combinations of factors, such as time, route specific download limits, etc. Implementing BGP route flap damping with the present embodiments of the invention prevents the network device from beings overloaded before BGP route flap damping is triggered.

The control card 903 illustrated in FIG. 9 includes memories, processors, and/or ASICs. Such memories include a machine-readable medium on which is stored a set of instructions (i.e., software) embodying any one, or all, of the methodologies described herein. Software can reside, completely or at least partially, within this memory and/or within the processor and/or ASICs. For the purpose of this specification, the term "machine-readable medium" shall be taken to include any mechanism that provides (i.e., stores and/or transmits) information in a form readable by a machine (e.g., a computer). For example, a machine-readable medium includes read only memory ("ROM"), random access memory ("RAM"), magnetic disk storage media, optical storage media, flash memory devices, electrical, optical, acoustical, or other form of propagated signals (e.g., carrier waves, infrared signals, digital signals, etc.), etc.

While the invention has been described in terms of several embodiments, those skilled in the art will recognize that the invention is not limited to the embodiments described. In an alternative embodiment of the invention, modified relationships in the RIB are downloaded to the FIBs in accordance with priority and workload. For example, line cards which are more active than other line cards will receive a higher priority, thus receiving modified parts of the RIB 300 before lower priority line cards. Line cads with low activity receive modified parts of the RIB 300 at specified time intervals.

The method and apparatus of the invention can be practiced with modification and alteration within the spirit and scope of the appended claims. The description is thus to be regarded as illustrative instead of limiting on the invention.

We claim:

1. A computer implemented method comprising:
   managing a routing information base (RIB), the RIB including a first set of elements that indicate a set or destinations, a second set of elements that indicate a set of next hops, a third set of elements that indicate a set of interfaces, wherein the first, second, and third sets of elements are separate data structures, wherein the first set of elements reference the second set of elements, and wherein the second set of elements reference the third set of elements to establish relationships between the set of next hops and the set of interfaces;
   receiving a message that indicates a modification to a plurality of routes corresponding to a plurality of the first set of elements; and
   modifying a first relationship between one of the second set of elements and a first one of the third set of elements and a second relationship between the one of the second set of elements and a second one of the third set of elements in accordance with the message, the one of the second set of elements referenced by the plurality of the first set of elements.

2. The computer implemented method of claim 1 wherein the first set of elements are elements of a first radix trie and the second set of elements are elements of a second radix trie.

3. The computer implemented method of claim 1 wherein the third set of elements are elements of a PATRICIA trie.

4. The computer implemented method of claim 1 further comprising downloading the modified first and second relationships to a set of one or more forwarding information bases.

5. The computer implemented method of claim 1 further comprising:
   receiving a second message that indicates a modification to a second plurality of routes, the second plurality of routes corresponding to a second plurality of the first set of elements; and
   modifying a relationship between a second one of the second set of elements and a third one of the second set of elements and between the second one of the second set of elements and a fourth one of the second set of elements in accordance with the message.

6. A computer implemented method comprising:
   managing a first data structure, a second data structure, and a third data structure, the first, second and third data structures being in a routing information base (RIB), the first data structure including a first set of elements, the first set of elements indicating a set of destinations, the second data structure including a second set of elements, the second set of elements indicating a set of next hops, the third data structure including a third set of elements, the third set of elements indicating a set of interfaces, wherein the first set of elements reference the second set of elements, and wherein the second set of elements reference the third set of elements to establish relationships between the set of next hops and the set of interfaces;
   receiving a message, the message indicating an interface;
   modifying relationships between one of the second set of elements and a first and second one of the third set of elements in response to the message, the one of the second set of elements indicating one of the set of next hops and the first one of the third set of elements indicating the interface; and downloading the modified relationships to a forwarding information base (FIB).

7. The computer implemented method of claim 6 wherein the first data structure is a first radix trie and the second data structure is a second radix trie.

8. The computer implemented method of claim 6 wherein the third data structure is a PATRICIA trie.

9. The computer implemented method of claim 6 wherein the set of interfaces are a set of logical interfaces.

10. The computer implemented method of claim 6 further comprising:

receiving a second message that indicates a second next hop and a destination; and modifying relationships between one of the first set of elements and a second one of the second set of elements and between the second one of the second set of elements and a third one of the second set of elements in accordance with the message, the one of the first set of elements indicating the destination and the second one of the second set of elements indicating the second next hop.

11. A system comprising:

a first network device to transmit a message, the message indicating an interface; and a second network device coupled with the first network device, the second network device to receive the message, to modify relationships between one of a first set of elements and a first and second one of a second set of elements in accordance with the message, the first set of elements to indicate a set of next hops and the second set of elements to indicate a set of interfaces, the first set of elements to reference the second set or elements to establish relationships between the set of next hops and the set of interfaces, the one of the first set of elements to reference a plurality of a third set of elements, the third set of elements to indicate a set of destinations, and the second network device to download the modified relationships to a forwarding information base (FIB).

12. The system of claim 11 wherein the first set of elements are elements of a first radix trie and the third set of elements are elements of a second radix trie.

13. The system of claim 11 wherein the second set of elements are elements of a PATRICIA trie.

14. The system of claim 11 further comprising:

a third network device coupled with the second network device, the third network device to transmit a second message to the second network device, the second message to indicate a next hop and a destination; and the second network device to receive the second message and in accordance with the second message to modify relationships between one of the third set of elements and a second one of the first set of elements, and between the second one of the first set of elements and a third one of the first set of elements, the one of the third set of elements to indicate the destination and the second one of the first set of elements to indicate the next hop.

15. An apparatus comprising:

a memory to host a routing in formation base (RIB), the RIB to include a first data structure, a second data structure, and a third data structure, the first data structure to include a first set of elements, the first set of elements to indicate a set of destinations, the second data structure to include a second set of elements, the second set of elements to indicate a set of next hops, the third data structure to include a third set of elements, the third set of elements to indicate a set of interfaces, the first set of elements to reference the second set of elements, and the second set of elements to reference the third set of elements to establish relationships between the set of next hops and the set of interfaces;

a RIB module to receive a message, the message to indicate a modification to a plurality of routes corresponding to a plurality of the first set of elements, the RIB module to modify a first relationship between one of the second set of elements and a first one of the third set of elements and a second relationship between the one of the second set of elements and a second one of the third set of elements in accordance with the message, the one of the second set of elements referenced by the plurality of the first set of elements; and a line card to host a forwarding information base and to receive the modified first the second relationship.

16. The apparatus of claim 15 wherein the first data structure is a first radix trie and the second data structure is a second radix trie.

17. The apparatus of claim 15 wherein the third data structure is a PATRICIA trie.

18. The apparatus of claim 15 further comprising a control card coupled with the line card, the control card to host the memory and to host the RIB module.

19. An apparatus comprising:

a machine readable storage medium that provide instructions, which when executed by a set of one or more processors, cause said set of processors to perform operations that includes, managing a data structure used as a routing information base, the data structure having, a first set of elements, each of the first set of elements having a first data field to indicate a destination and a second data field to reference one of a second set of elements, each of the second set of elements having a third data field to indicate a next hop and a fourth data field to reference one of a third set of elements, and each of the third set of elements having a fifth data field to indicate an interface and a sixth data field to reference a referencing one of the second set of elements.

20. The apparatus of claim 19 wherein the first set of elements is a first radix trie and the second set of elements is a second radix trie.

21. The apparatus of claim 19 wherein the third set of elements is a PATRICIA trie.

22. The apparatus of claim 19 wherein each of the second set of elements has a seventh data field to indicate a number of referencing elements of the first set of elements.

23. The apparatus of claim 19 wherein the fourth data field of the second set of elements references one of the second set of elements.

24. A network device, comprising:

a set of one or more line cards, each of the set of line cards to host a forwarding information base (FIB) and to forward traffic in accordance with their FIB; and a set of one or more control cards coupled with the set of line cards, the set of control cards to host a set of one or more routing processes and a routing information base (RIB), to modify the RIB in accordance with the set of routing processes and having a set of instructions to cause the set of one or more control cards to download modifications of the RIB to the set of line cards, the RIB to include, a first data structure having a first field to indicate a destination and a second field to reference a third field, a second data structure having the third field to indicate a next hop and a fourth field to reference a fifth field, and a third data structure having the fifth field to indicate an interface and a sixth field to reference the third field.

25. The network device of claim 24 further comprising a transmission medium coupled with the set of control cards and the set of line cards, the transmission medium to carry the modifications from the set of control cards to the set of line cards.

26. A machine-readable medium that provides instructions, which when executed by a set of one or more processors, cause said set of processors to perform operations comprising:

managing a set of routing information as a routing information base (RIB) comprising, a first data structure having a first field to indicate a destination and a second field to reference a third field, a second data structure having the third field to indicate a next hop and a fourth field to reference a fifth field, and a third data structure having the fifth field to indicate an interface and a sixth field to reference the third field;

downloading a subset of the set of routing information as forwarding information for a set of one or more forwarding information bases (FIBs);

modifying the RIB; and downloading the RIB modifications to the FIBs.

27. The machine-readable medium of claim 26 wherein the first data structure is a radix trie.

28. The machine-readable medium of claim 26 wherein the second data structure is a radix trie.

* * * * *